US010171889B2

(12) United States Patent
Clark et al.

(10) Patent No.: US 10,171,889 B2
(45) Date of Patent: Jan. 1, 2019

(54) METHOD AND SYSTEM FOR MANAGING INTERNAL AND EXTERNAL CALLS FOR A GROUP OF COMMUNICATION CLIENTS SHARING A COMMON CUSTOMER IDENTIFIER

(75) Inventors: David William Clark, Carp (CA); Jonathan Allan Arsenault, Orleans (CA); Jeffrey William Dawson, Stittsville (CA); Eric John Wolf, Stittsville (CA)

(73) Assignee: BCE INC., Verdun (CA)

( * ) Notice: Subject to any disclaimer, the term of this patent is extended or adjusted under 35 U.S.C. 154(b) by 1565 days.

(21) Appl. No.: 11/993,748

(22) PCT Filed: Dec. 21, 2006

(86) PCT No.: PCT/CA2006/002086
§ 371 (c)(1),
(2), (4) Date: May 7, 2010

(87) PCT Pub. No.: WO2008/074122
PCT Pub. Date: Jun. 26, 2008

(65) Prior Publication Data
US 2010/0220714 A1      Sep. 2, 2010

(51) Int. Cl.
*H04L 12/66* (2006.01)
*H04Q 3/62* (2006.01)
(Continued)

(52) U.S. Cl.
CPC .............. *H04Q 3/62* (2013.01); *H04M 3/46* (2013.01); *H04M 7/006* (2013.01);
(Continued)

(58) Field of Classification Search
CPC .. H04M 3/4234; H04M 3/42314; H04M 3/54; H04M 3/436; H04M 3/546; H04M 1/006
(Continued)

(56) References Cited

U.S. PATENT DOCUMENTS

| 4,764,919 A | 8/1988 | Hunter et al. |
| 6,763,102 B1 | 7/2004 | Chen et al. |

(Continued)

FOREIGN PATENT DOCUMENTS

| WO | WO 02/23822 A1 | 3/2002 |
| WO | PCT/CA2006/002086 | 9/2007 |

OTHER PUBLICATIONS

US 6,724,754, 04/2004, Galvin et al. (withdrawn)
Official Action dated Nov. 6, 2015 for Canadian Patent Application No. 2,612,920.

*Primary Examiner* — Asad M Nawaz
*Assistant Examiner* — Najeeb Ansari

(57) ABSTRACT

A method and network element for implementing a virtual PBX feature for a customer associated with a plurality of endpoints. The method comprises receiving information regarding a call. Based on the information regarding the call, it is determined if the call is an external inbound call or an internal call that identifies a particular one of the endpoints. Responsive to determining that the call is an external inbound call, the call is caused to be routed to the plurality of endpoints associated with the customer, while responsive to determining that the call is an internal call that identifies a particular one of the endpoints, the call is caused to be routed to the particular one of the endpoints. This allows members of a small business or household to share a common external subscriber line, while also allowing the members to reach one another with ease.

52 Claims, 7 Drawing Sheets

(51) Int. Cl.
　　　*H04M 3/46*　　　　(2006.01)
　　　*H04M 7/00*　　　　(2006.01)
　　　H04M 3/42　　　　(2006.01)

(52) U.S. Cl.
　　　CPC . *H04M 3/42059* (2013.01); *H04Q 2213/1322* (2013.01); *H04Q 2213/13034* (2013.01); *H04Q 2213/13097* (2013.01); *H04Q 2213/13222* (2013.01); *H04Q 2213/13286* (2013.01); *H04Q 2213/13389* (2013.01)

(58) Field of Classification Search
　　　USPC .......................................... 379/211; 370/352
　　　See application file for complete search history.

(56) References Cited

U.S. PATENT DOCUMENTS

| | | | |
|---|---|---|---|
| 6,775,272 | B2 | 8/2004 | Galvin et al. |
| 7,305,079 | B1 * | 12/2007 | Forte .................. 379/211.01 |
| 2002/0019246 | A1 * | 2/2002 | Forte ............................ 455/555 |
| 2003/0035523 | A1 * | 2/2003 | Mansfield ................. 379/93.07 |
| 2003/0235182 | A1 * | 12/2003 | McMullin .......... H04L 12/2801 |
| | | | 370/352 |
| 2004/0160951 | A1 | 8/2004 | Galvin et al. |
| 2004/0170268 | A1 | 9/2004 | Hakusui |
| 2006/0227957 | A1 * | 10/2006 | Dolan et al. ............. 379/212.01 |
| 2006/0245569 | A1 * | 11/2006 | Forte ....................... 379/211.01 |
| 2007/0047534 | A1 * | 3/2007 | Hakusui ......................... 370/356 |
| 2007/0211705 | A1 * | 9/2007 | Sunstrum .......... H04L 29/06027 |
| | | | 370/356 |
| 2008/0069083 | A1 * | 3/2008 | Cowick ........................ 370/352 |

* cited by examiner

| Customer Identifier | Subscriber to Virtual PBX Feature? | Address | Associated Sub-Addresses | Alias |
|---|---|---|---|---|
| 4162223333@serviceprovider.com | YES | 64.230.200.100 | 8080 | 3551 |
| | | | 8081 | 0 |
| | | | 8082 | 911 |
| 4165556666@serviceprovider.com | NO | 64.230.200.101 | 5060 | N/A (default) |
| ... | ... | ... | ... | ... |

200

202, 206, 204, 208, 210

220 (associated with customer 101A)
230 (associated with customer 101B)
240 (associated with Other customers)

FIG. 2A

METHOD AND SYSTEM FOR MANAGING INTERNAL AND EXTERNAL CALLS FOR A GROUP OF COMMUNICATION CLIENTS SHARING A COMMON CUSTOMER IDENTIFIER

FIELD OF THE INVENTION

The present invention relates generally to communications over a data network and, more particularly, to a method and system for managing communications for a group of communication clients sharing a common customer identifier.

BACKGROUND

Small businesses and households that subscribe to a single telephone line (i.e., that are reachable via a single directory number) typically have a plurality of telephones connected to the single telephone line. When a call is placed to the small business or household via a telephony network (e.g., by dialing the directory number), all telephones ring contemporaneously, allowing any member of the small business or household to answer the call.

If members of the small business or household wish to call one another, a different system must be used. For example, individuals may utilize a point-to-point communication system that acts as a local network among employees of the small business or residents of the household. However, this represents an additional technology maintenance responsibility and cost burden for the household or small business.

A private branch exchange (PBX) or key system is another solution for allowing members of the small business or household to communicate with one another by dialing "extensions". However, calls placed from the telephony network to the small business or household will also need to pass through the PBX or key system, at which point the caller needs to identify the specific extension to which to direct the call. This is an inconvenience for the caller and, in the case of a small business, it may lead to lost revenue as it may dissuade people from calling.

Thus, there remains a need in the industry to provide a technological solution that allows members of a small business or household to share a common subscriber line from the perspective of the telephony network, while also allowing the members to reach one another with ease.

SUMMARY OF THE INVENTION

A first broad aspect of the present invention seeks to provide a method of implementing a virtual PBX feature for a customer associated with a plurality of endpoints. The method comprises receiving information regarding a call; determining from the information regarding the call if the call is an external inbound call or an internal call that identifies a particular one of the endpoints; responsive to determining that the call is an external inbound call, causing the call to be routed to the plurality of endpoints associated with the customer; and responsive to determining that the call is an internal call that identifies a particular one of the endpoints, causing the call to be routed to the particular one of the endpoints.

A second broad aspect of the present invention seeks to provide a network element for implementing a virtual PBX feature for a customer associated with a plurality of endpoints. The network element comprises means for receiving information regarding a call; means for determining from the information regarding the call if the call is an external inbound call or an internal call that identifies a particular one of the endpoints; means for causing the call to be routed to the plurality of endpoints associated with the customer if the call is determined to be an external inbound call; and means for causing the call to be routed to a particular one of the endpoints if the call is determined to be an internal call that identifies the particular one of the endpoints.

A third broad aspect of the present invention seeks to provide computer-readable media comprising computer-readable program code which, when executed by a network element, causes the network element to implement a virtual PBX feature for a customer associated with a plurality of endpoints. The computer-readable program code comprises first computer-readable program code for causing the network element to be attentive to receipt of information regarding a call; second computer-readable program code for causing the network element to determine from the information regarding the call if the call is an external inbound call or an internal call that identifies a particular one of the endpoints; third computer-readable program code for causing the network element to cause the call to be routed to the plurality of endpoints associated with the customer if the call is determined to be an external inbound call; and fourth computer-readable program code for causing the network element to cause the call to be routed to a particular one of the endpoints if the call is determined to be an internal call that identifies the particular one of the endpoints.

A fourth broad aspect of the present invention seeks to provide a network element for implementing a virtual PBX feature for a customer associated with a plurality of endpoints. The network element comprises a switching entity configured to route a call from a calling party to a called party on a basis of control instructions; and a control entity configured to generate the control instructions, the control instructions for causing the switching entity to route the call to the plurality of endpoints associated with the customer or to a particular one of the endpoints, depending on whether the call is determined to be an external inbound call or an internal call that identifies the particular one of the endpoints, respectively.

A fifth broad aspect of the present invention seeks to provide a method of implementing a virtual PBX feature for a customer associated with a plurality of endpoints. The method comprises causing external inbound calls that specify the customer to be routed to the plurality of endpoints associated with the customer; and causing internal calls that identify particular ones of the endpoints to be routed to those endpoints.

A sixth broad aspect of the present invention seeks to provide a network element for implementing a virtual PBX feature for a first customer associated with a plurality of first endpoints and a second customer associated with a plurality of second endpoints. The network element comprises a switching entity configured to route a call from a calling party to a called party on a basis of control instructions; and a control entity configured to generate said control instructions. The control instructions are for causing the switching entity to route the call to (I) the plurality of first endpoints; (II) the plurality of second endpoints; (III) a particular one of the first endpoints; or (IV) a particular one of the second endpoints, depending on whether the call is determined to be (I) an external inbound call for the first customer; (II) an external inbound call for the second customer; (III) an internal call that identifies the particular one of the first endpoints; or (IV) an internal call that identifies the particular one of the second endpoints, respectively.

A seventh broad aspect of the present invention seeks to provide a method of implementing a virtual PBX feature for a plurality of customers associated with respective pluralities of endpoints. The method comprises receiving information regarding a call; determining from the information regarding the call if the call is an external inbound call for a given one of said plurality of customers or an internal call that identifies a particular one of the endpoints associated with a given one of said plurality of customers; responsive to determining that the call is an external inbound call, causing the call to be routed to the plurality of endpoints associated with the given one of said customers; and, responsive to determining that the call is an internal call that identifies a particular one of the endpoints associated with a given one of said plurality of customers, causing the call to be routed to the particular one of the endpoints associated with said given one of said plurality of customers.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIGS. 2A and 2B are illustrative of a database for use by a control entity in the architectures of FIGS. 1A and 1B, respectively;

It is to be expressly understood that the description and drawings are only for the purpose of illustration of certain embodiments of the invention and are an aid for understanding. They are not intended to be a definition of the limits of the invention.

DETAILED DESCRIPTION OF NON-LIMITING EMBODIMENTS

Figure 1A:
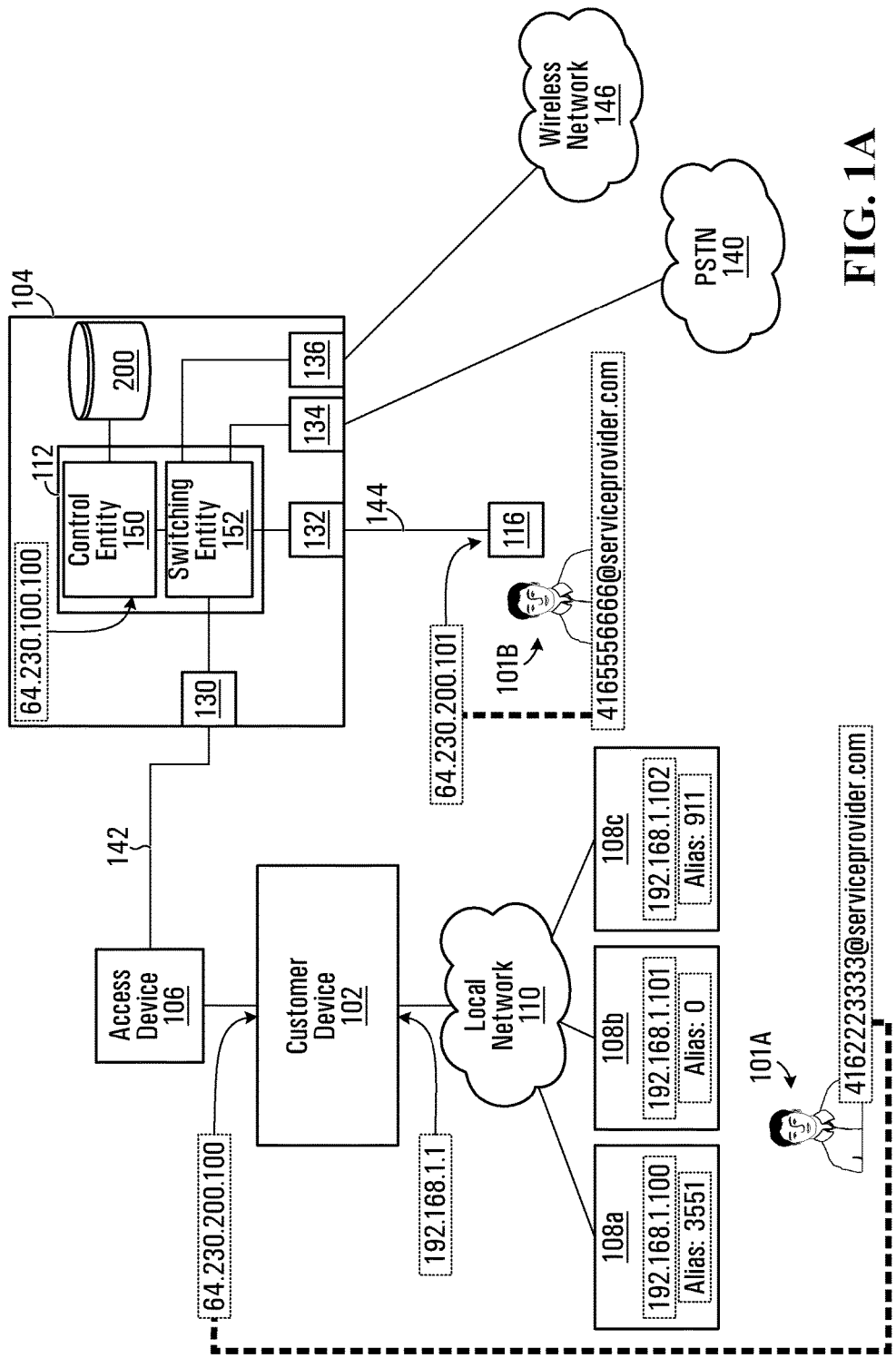
FIGS. 1A and 1B are block diagrams of an architecture for managing internal and external calls for a group of communication clients sharing a common customer identifier, in accordance with non-limiting embodiments of the present invention.

With reference to FIG. 1A, there is shown an architecture for managing internal and external calls for a group of communication clients sharing a common customer identifier. The architecture comprises a data network 104 with a network element 112 operated by a service provider. The data network 104 may be connected to other networks, such as the public switched telephone network (PSTN) 140 and/or a wireless network 146. Communication with the PSTN 140 can be effected via a gateway 134, while communication with the wireless network 146 can be effected via a gateway 136.

The network element 112 can comprise circuitry, software and/or control logic for processing calls placed to and from various communication clients coupled to the data network 104. Examples of call processing include connecting incoming calls, routing outgoing calls, applying a call waiting or call forking feature, etc. Additionally, the network element 112 can comprise suitable circuitry, software and/or control logic for routing outgoing calls to, and connecting incoming calls from, entities in the PSTN 140 and/or the wireless network 146 via the respective gateway 134, 136.

In accordance with a specific non-limiting example embodiment, the network element 112 can be the MCS 5200 Soft Switch manufactured by Nortel Networks Limited of 8200 Dixie Road, Brampton, Ontario L6T 5P6, Canada, although it should be appreciated that this is but one non-limiting example among many possibilities within the scope of the present invention.

The network element 112 can comprise a switching entity 152 that executes signaling and switching operations on calls traveling through the data network 104, as well as a control entity 150 that executes a variety of applications for intelligently controlling the signaling and switching operations performed by the switching entity 152. For example, the control entity 150 can provide control instructions to the switching entity 152. In some embodiments, the switching entity 152 and the control entity 150 may be part of the same physical device (e.g., a soft switch), while in other embodiments, the switching entity 152 and the control entity 150 may be separate physical devices.

The service provider that operates the network element 112 provides communication services to a plurality of customers such as 101A, 101B and others not shown. According to non-limiting embodiments of the present invention, the network element 112 implements a virtual PBX feature for customer 101A as well as other customers, possibly including customer 101B.

Each of the customers is registered with the control entity 150 under a customer identifier, which can be, for example, a session initiation protocol (SIP) uniform resource identifier (URI). In the present non-limiting example, customer 101A is registered under a customer identifier which is the SIP URI "4162223333@serviceprovider.com", while customer 101B is registered under a customer identifier which is the SIP URI "4165556666@serviceprovider.com". Other customers may of course be registered under different customer identifiers. Of course, different formats for the customer identifier can be used without departing from the spirit of the invention.

In order to make or receive communication attempts, each of the customers 101A, 101B indicates to the service provider at least one address of a device utilized by the customer in question, i.e., where the customer in question can be reached when an incoming call is placed to the customer and/or from which the customer in question expects to make outgoing calls. Depending on the circumstances, such a device may be a landline telephone in the PSTN 140, a mobile phone in the wireless network 146, a VoIP phone in the data network 104, a computer in the data network 104 running a VoIP soft client, a data network appliance in the data network 104 such as a residential gateway, a business gateway, etc. In each case, knowledge of each device's address allows calls (such as telephony calls) to be properly handled by the network element 112.

Depending on the circumstances, the address of a device utilized by a given customer can be an electronic serial number (ESN), a media access control (MAC) address, a URL, an Internet Protocol (IP) address, a proprietary identifier, etc. In the non-limiting scenario being described here, the addresses of the devices used by customers 101A, 101B are indeed IP addresses, which can be IPv4 or IPv6 addresses, for example. Specifically, customer 101A utilizes a customer device 102 (such as a gateway which can be a residential/business gateway in a specific non-limiting embodiment) having an IP address 64.230.200.100 that is visible from the data network 104, while customer 101B utilizes a device 116 (hereinafter referred to as a "communication client" 116) having an IP address 64.230.200.101. An example of where user 101A utilizes a plurality of devices having respective IP addresses will be described later on with reference to FIG. 1B.

The aforesaid IP addresses can be referred to as "discoverable" or "public", in the sense that they allow the devices with which they are associated to be uniquely identified within the data network 104. Thus, packets that originate from the residential/business gateway 102 will have a source address of 64.230.200.100 and packets that are destined for the residential/business gateway 102 will have a destination address of 64.230.200.100. Similarly, packets that originate from communication client 116 will have a source address of 64.230.200.101 and packets that are destined for communication client 116 will have a destination address of 64.230.200.101.

Continuing with the description of the architecture in FIG. 1A, communication client 116 may be connected to the network element 112 via a communication link 144 and a portion 132 of the data network 104. The communication link 144 can be any suitable wired, wireless or optical communication link, such as an xDSL link, an Ethernet link, a fiber optic link (e.g., Fiber-to-the-Premise, Fiber-to-the-Curb, etc.), a wireless link (e.g., EV-DO, WiMax, WiFi, CDMA, TDMA, GSM, UMTS, etc.), a coaxial cable link, or a combination thereof. The portion 132 of the data network 104 may comprise one or more switches, multiplexers, concentrators and other equipment.

The residential/business gateway 102 may be connected to the network element 112 via an access device 106, a communication link 142 and a portion 130 of the data network 104. The portion 130 of the data network 104 may comprise one or more switches, multiplexers, concentrators and other equipment. The communication link 142 can be any suitable wired, wireless or optical communication link, such as an xDSL link, an Ethernet link, a fiber optic link (e.g., Fiber-to-the-Premise, Fiber-to-the-Curb, etc.), a wireless link (e.g., EV-DO, WiMax, WiFi, CDMA, TDMA, GSM, UMTS, etc.), a coaxial cable link, or a combination thereof. It should be appreciated that the specific implementation of the access device 106 will be dependent on the specific implementation of the communication link 142. Thus, in an embodiment where the communication link 142 is an xDSL link, the access device 106 may be an xDSL modem. In another embodiment where the communication link is a WiMax link, the access device 106 may be a WiMax modem. It should also be appreciated that in certain embodiments, some or all of the functionality of the access device 106 can be incorporated into the residential/business gateway 102.

In the architecture of FIG. 1A, the residential/business gateway 102 communicates locally with a plurality of communication clients 108A, 108B, 108C via a local network 110, which is optional. Each of the communication clients 108A, 108B, 108C can be considered a potential endpoint for an incoming or outgoing communication session such as a call. Communication clients 108A, 108B, 108C may be distributed throughout a household or small business; they may be located within the same building or geographically disparate. While only three communication clients (namely, communication clients 108A, 108B, 108C) are illustrated in FIG. 1A, it should be understood that the present invention does not impose any limitation on the number of communication clients that may communicate with the residential/business gateway 102. It should also be appreciated that when the communication clients are geographically disparate, the manner in which they access the data network 104 can involve a plurality of access devices or residential gateway.

Each of the devices on the local network 110 (namely, the residential/business gateway 102 and communication clients 108A, 108B, 108C) is associated with a local, or "private" address, which is valid only for communication within the local network 110. Such private addresses may take the form of an electronic serial number (ESN), a media access control (MAC) address, a URL, an Internet Protocol (IP) address, a proprietary identifier, etc. In the non-limiting example being described here, the residential/business gateway 102 is associated with a private IP address 192.168.1.1, while communication clients 108A, 108B, 108C are associated with private IP addresses 192.168.1.100, 192.168.1.101, 192.168.1.102, respectively. These private addresses can be assigned by the residential/business gateway 102 or by another entity, such as a Dynamic Host Configuration Protocol (DHCP) server (not shown), for example.

For data that circulates exclusively within the local network 110, the use of private addresses is satisfactory. However, for data that enters or needs to exit the local network 110 (such as call-related data that is exchanged between communication clients 108A, 108B and 108C on one hand, and the data network 104 on the other), there needs to be a way to distinguish between data destined for—or originating from—different ones of communication clients 108A, 108B, 108C.

In one non-limiting approach, when communication client 108A initiates a communication session, it selects an IP "port", which is specified in all packets related to the current session that it sends onto the local network 110. Upon receipt of packets from communication client 108A, the residential/business gateway 102 therefore knows the port being used by communication client 108A. If the communication initiated by communication client 108A is destined for the data network 104 (based on information contained in the received packets), then the residential/business gateway 102 sends the received (but outward bound) packets onto the data network 104, but replaces the source address of the packet with the public IP address of the residential/business gateway 102. In addition, the port may or may not be modified by the residential/business gateway 102, depending on whether it needs to avoid ambiguity due to other communication devices 108B, 108C having already selected the port in question. In the opposite direction of communication, when packets are received from the data network 104 and specify the port that had been utilized by communication client 108A (or, if applicable, the modified port as modified by the residential/business gateway 102), the residential/business gateway 102 will recognize that the packet is destined for communication client 108A and will therefore replace the destination address of those packets with the private IP address of communication client 108A (along with changing the port value, if applicable) prior to sending the received (incoming) packets onto the local network 110. To achieve the aforementioned address translation functionality, the residential/business gateway 102 can maintain an internal mapping that allows the residential/business gateway 102 to know which ports are associated with which communication clients.

In the present non-limiting example, it is assumed that ports 8080, 8081, 8082 are respectively utilized by communication clients 108A, 108B, 108C having respective private addresses 192.168.1.100, 192.168.1.101, 192.168.1.102. No assumption is made as to whether the residential/business gateway 102 does or does not perform a modification of the ports when routing packets between communication clients 108A, 108B and 108C on one hand, and the data network 104 on the other.

With additional reference now to FIG. 2A, a database 200 that is accessible to the control entity 150 stores data pertaining to the various customers in the architecture of FIG. 1A, and particularly the relationship between customer identifiers and the addresses of the devices utilized by those customers. Specifically, the database 200 comprises a plurality of records 220, 230 respectively associated with customers 101A, 101B. Records associated with customers other than customers 101A, 101B are represented by reference numeral 240. Of course other data structures could be used, such as linked lists, tables, etc.

Each record in the database 200 has a respective customer identifier field 202 and one or more respective address field(s) 204. The customer identifier field 202 of the record associated with a given customer stores the customer identifier of the given customer. Thus, in the present non-limiting example, the customer identifier field 202 of the record 220 associated with customer 101A stores the SIP URI 4162223333@serviceprovider.com, while the customer identifier field 202 of the record 230 associated with customer 101B stores the SIP URI 4165556666@ serviceprovider.com. For its part, the address field(s) 204 of the record associated with a given customer store(s) the address(es) of one or more devices utilized by the given customer. In the present non-limiting example, there are three (3) address fields 204 of the record 220 associated with customer 101A, each of which stores the IP address 64.230.200.100, while there is one address field 204 of the record 230 associated with customer 101B, which stores the IP address 64.230.200.101.

In some cases, a device whose address is specified in one of the address fields 204 of a particular record in the database 200 is a communication client. This is the case with communication client 116 employed by customer 101B. A default port (in this case, port 5060) may be used by communication client 116 to communicate over the data network 104. This port may optionally be identified in a sub-address field 208 of the record 230 associated with customer 101B. Alternatively, the sub-address field 208 of the record 230 associated with customer 101B can be left blank in order to signify that there is no specific port used by communication client 116 to communicate over the data network 104.

In other cases, the device whose address is specified in the address field(s) 204 of a particular record in the database 200 is not a communication client itself, but rather is an intermediary to one or more terminal devices. This is the case with the residential/business gateway 102 utilized by customer 101A, which allows communication with the aforesaid plurality of communication clients 108A, 108B, 108C via the local network 110. More specifically, the residential/business gateway 102 uses ports 8080, 8081 and 8082 to communicate with communication clients 108A, 108B and 108C, respectively. The fact that the device utilized by customer 101A (namely, the residential/business gateway 102) communicates with one or more communication clients (namely, communication clients 108A, 108B, 108C) is captured in the database 200 by storing the identities of the corresponding ports in respective sub-address fields 208 of the record 220 associated with customer 101A. Thus, three sub-address fields 208 of the record 220 associated with customer 101A include the identities of ports 8080, 8081 and 8082, respectively.

The database 200 can be populated in a variety of ways. For example, the database 200 can be populated during a registration phase involving the control entity 150, which comprises suitable software, hardware, firmware and/or control logic for executing a registration process. In some embodiments, the registration phase begins after customer 101A obtains the residential/business gateway 102 from the service provider, with the residential/business gateway 102 having been programmed with an address where the control entity 150 can be reached in the data network 104. In the present non-limiting example, the address where the control entity 150 is an IP address, namely, 64.230.100.100. In other embodiments, the residential/business gateway 102 is programmed with an address where a proxy server can be reached, and it is the proxy server that ultimately knows how to reach the control entity 150. In either case, when the residential/business gateway 102 is activated, it establishes its presence on the data network 104 and contacts the control entity 150. By virtue of executing the registration process, the control entity 150 determines that the residential/business gateway 102 is associated with customer 101A in one of various ways, such as by comparing the address of the residential/business gateway 102 to a statically pre-provisioned address known to be associated with customer 101A, or by obtaining credentials entered by customer 101A via the residential/business gateway 102. In either case, the customer identifier field 202 and the address field(s) 204 of the record 220 associated with customer 101A can be populated.

Continuing with the description of the database 200, the record associated with a given customer further comprises an indication of whether the given customer subscribes to a virtual private branch exchange (VPBX) service as contemplated herein. In the present non-limiting example, customer 101A does subscribe to the VPBX service, while customer 101B does not. Accordingly, the record 220 associated with customer 101A includes a subscription field 206 that is positively marked, while the record 230 associated with customer 101B includes a subscription field 206 that is negatively marked. The subscription field 206 of the record associated with a given customer can be populated based on instructions from, or interaction with, the given customer at a suitable time and in a variety of different ways, such as via phone, web, email, post, etc.

Now, as individual ones of communication clients 108A, 108B, 108C are activated, they then attempt a communication with the control entity 150. This is achieved via the residential/business gateway 102. The control entity 150 then executes the registration process in respect of the individual communication clients 108A, 108B, 108C. More specifically, when communication client 108A is activated, it talks to the control entity 150 which determines (based on examination of the packets received from communication client 108A) that port 8080 is to be used for communication with communication client 108A. In this way, one of the three sub-address fields 208 of the record 220 associated with customer 101A can be populated with the identity of port 8080. Similarly, in the present example, the other two sub-address fields 208 of the record 220 associated with customer 101A can be populated with the identities of ports 8081 and 8082.

It should be understood that individual ones of communication clients 108A, 108B, 108C may be de-activated and/or re-activated at random times. This can correspondingly result in a fluctuation regarding which ports (and how many ports) are identified in the sub-address fields 208 of the record 220 associated with customer 101A. Also, the content of the sub-address field(s) 208 of the record 220 associated with customer 101A may change even while communication clients 108A, 108B, 108C remain online, for example if there is a dynamic change in the private address of one of communication clients 108A, 108B, 108C.

Those skilled in the art will appreciate that subscribing to the VPBX service as contemplated herein will be advantageous when communication clients 108A, 108B, 108C are employed by different people and/or are installed at different locations of a residence or business. Thus, it may be the case that the user of one of communication clients 108A, 108B, 108C wishes to reach the user of another one of communication clients 108A, 108B, 108C. In accordance with non-limiting embodiments of the present invention, this is made possible by associating an alias (or "nickname", or "extension") with each of the various communication clients 108A, 108B, 108C. By "alias" is meant a mnemonic, shortened string or other code that is different from the private IP address of the communication client in question. In one specific non-limiting embodiment, the alias can be designed to be quickly entered on a telephone and thus can consist of a short (e.g., 1-, 2-, 3-, 4- or 5-digit) number. In other embodiments, the alias can be a name, such as "Alice" or "Bob", "Shipping" or "Accounts", etc. Still other possibilities can exist without departing from the spirit of the invention.

While it is the case in the present embodiment that each of the communication clients subtending from the residential/business gateway 102 is associated with a respective alias, this need not be the case in all embodiments. In still other embodiments, two or more of the communication clients 108A, 108B, 108C may be associated with the same alias.

In the present non-limiting example, the alias associated with communication client 108A is "3551", the alias associated with communication client 108B is "0" and the alias associated with communication client 108C is "911". Thus, in a small business scenario, for example, dialing "3551" from either communication client 108B or 108C signifies an attempt to reach an employee presumed to be utilizing communication client 108A, whereas dialing "0" from either communication client 108A or 108C signifies an attempt to reach an operator (who is presumed to be utilizing communication client 108B), and dialing "911" from either communication client 108A or 108B signifies an attempt to reach the security desk (which is presumed to be utilizing communication client 108C).

In the case where there are aliases associated with certain communication clients, the association between the aliases and the communication clients is stored in the database 200. Specifically, the record 220 associated with customer 101A comprises one or more alias field(s) 210, each of which maps a corresponding address/sub-address pair of the record 220 with the alias of the communication client reachable at that address/sub-address pair. Thus, address 64.230.200.100 combined with port 8080 (which is used to reach communication client 108A) is associated with alias "3551", address 64.230.200.100 combined with port 8081 (which is used to reach communication client 108B) is associated with alias "0", while address 64.230.200.100 combined with port 8082 (which is used to reach communication client 108C) is associated with alias "911".

Selection of the aliases associated with communication clients 108A, 108B, 108C may be performed by the users of communication clients 108A, 108B, 108C or by the residential/business gateway 102, or even by the control entity 150 or the service provider.

Consider the scenario where selection of the aliases is performed by the users of communication clients 108A, 108B, 108C. Also, for the purposes of this example, assume that the user of communication client 108A (say, Alice) wishes to associate an alias with communication client 108A. When Alice activates communication client 108A and undergoes a registration phase with the control entity 150, the control entity 150 may ask Alice to enter the alias that Alice wishes to associate with communication client 108A. To this end, Alice may input the letters "A L I C E" to the control entity 150 or may cause the control entity 150 recording of the spoken utterance "/'a-l&-s/", which is the phonetic rendition of the word "Alice". In the latter case, the control entity 150 may perform speech-to-text processing in order to derive the alias "Alice". Either way, the control entity 150 proceeds to store the alias "Alice" in association with the combination of address 64.230.200.100 and port 8080 that is currently being used to communicate with communication client 108A during the registration phase.

Consider now the alternative scenario where selection of the aliases is performed by the residential/business gateway 102. In such circumstances, the residential/business gateway 102 knows which alias to associate with which communication client. In addition, the residential/business gateway 102 knows which address/sub-address pair is used for communication with which communication client. Thus, the residential/business gateway 102 can communicate the relationship between respective address/sub-address pairs and respective aliases to the control entity 150 for storage in the database 200. For example, the relationship between address 64.230.200.100, port 8080 and alias 3551, the relationship between address 64.230.200.101, port 8081 and alias 0, and the relationship between address 64.230.200.102, port 8082 and alias 911, can be communicated to the control entity 150 for storage in the alias field(s) 210 of the record 220 associated with customer 101A.

Persons skilled in the art will also appreciate that embodiments where selection of the aliases is done by, or with the assistance of, an administrator, are within the scope of the present invention. Aliases can also be defined before registration of the residential/business gateway 102 or before registration of any of the communication clients 108A, 108B, 108C. This can be achieved via a portal (e.g., a web portal) or through a customer service representative. The aliases can also be assigned by the service provider to avoid conflicts.

In the case where there are no aliases associated with certain other communication clients, no association would be stored in the database 200. For example, the record 230 associated with customer 101B comprises an alias field 210, which is empty in order to signify that there is no alias associated with communication client 116.

Figure 1B:
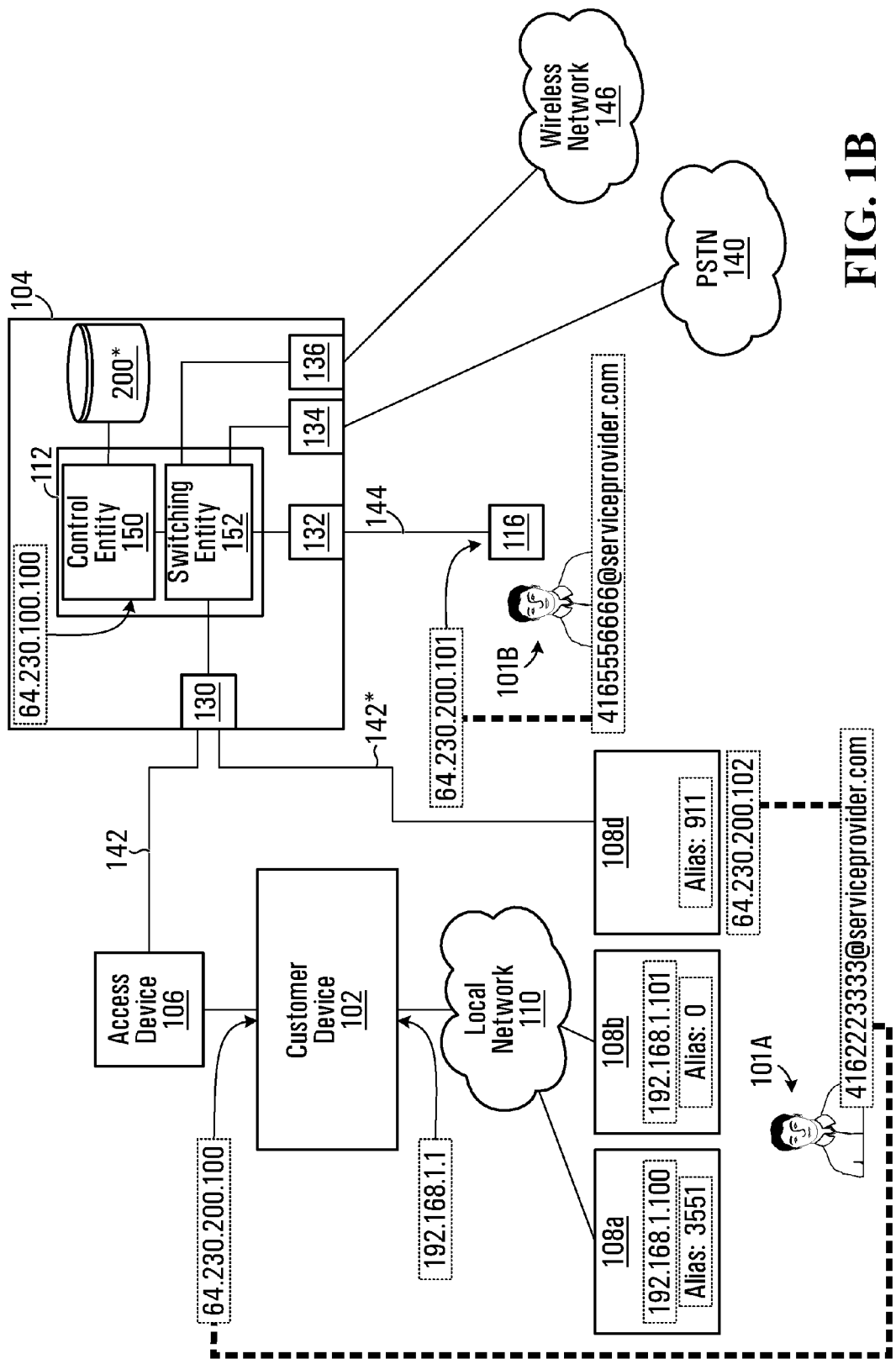

Reference is now made to FIG. 1B, which illustrates a variant of the architecture of FIG. 1A, where like numerals refer to like elements. Specifically, customer 101A indicates to the service provider the addresses of two devices utilized by customer 101A. Such devices are those where this customer can be reached when an incoming call is placed to the customer identifier "4162223333@serviceprovider.com" and/or devices with which this customer expects to make outgoing calls. In the non-limiting example being described here, customer 101A continues to utilize the residential/business gateway 102 (which now only serves communication clients 108A and 108B) but also now utilizes a communication client 108d, which is connected directly to the portion 130 of the data network 104 via a communication link 142*. The residential/business gateway 102 has the same address as before (namely 64.230.200.100), while communication client 108d has an IP address 64.230.200.102. The address of communication client 108d is "discoverable" or "public", in that data originating from communication client 108d will have a source address of 64.230.200.102 and data that is destined for communication client 108d will have a destination address of 64.230.200.102.

Figure 2B:
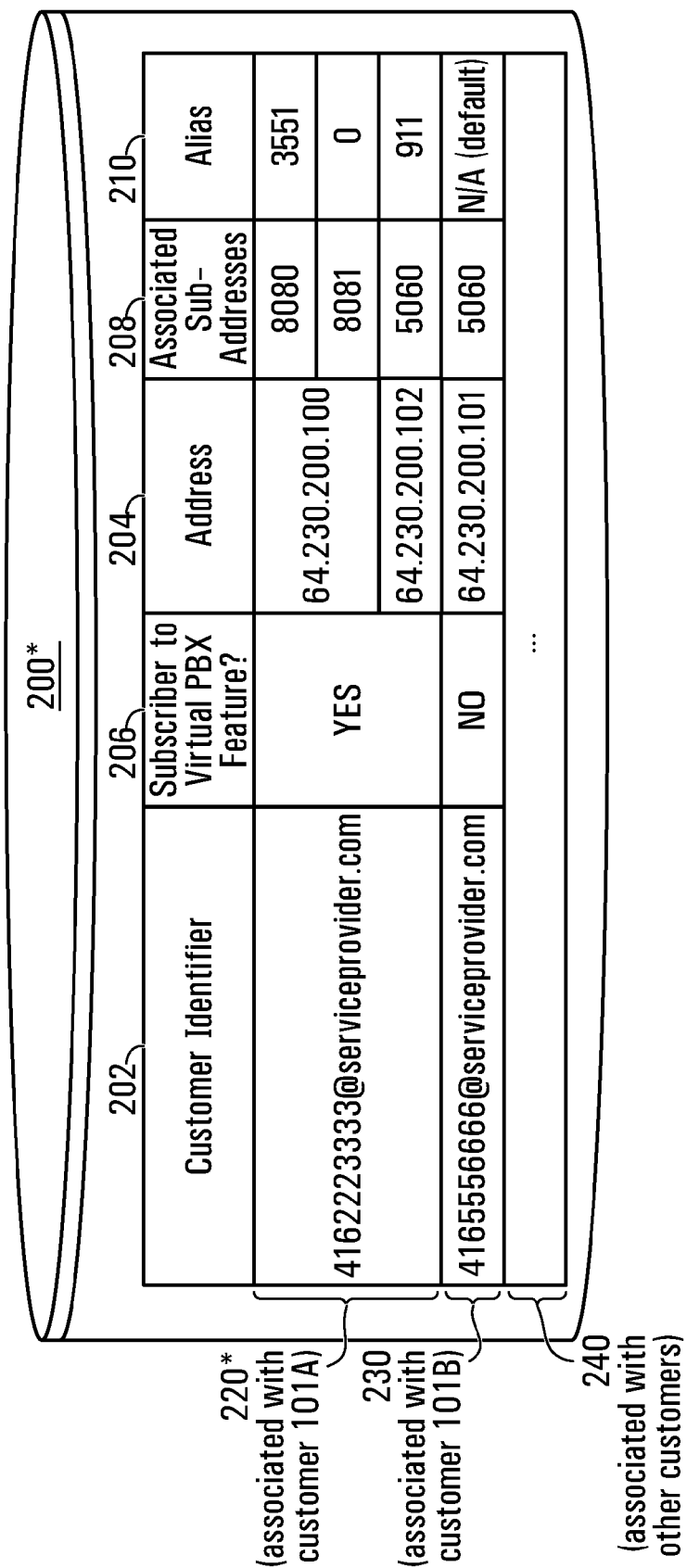

With additional reference now to FIG. 2B, a database 200* that is accessible to the control entity 150 maintains data pertaining to the various customers in the architecture of FIG. 1B, and particularly the relationship between customer identifiers and the addresses of the devices utilized by those customers. Specifically, the database 200* comprises a plurality of records 220*, 230 respectively associated with customers 101A, 101B. Records associated with customers other than customers 101A, 101B continue to be represented by reference numeral 240. As records 230, 240 are the same as those described earlier with reference to FIG. 2A, only record 220* will be described.

Record 220* has a customer identifier field 202 and two (2) respective address fields 204. The customer identifier field 202 of the record 220* associated with customer 101A stores the SIP URI 4162223333@serviceprovider.com. Although there are three (3) devices registered to customer 101A, there are only two (2) public IP addresses where those three devices can be reached. In the present example, communication clients 108A, 108B can be reached via the residential/business gateway 102 that has the IP address 64.230.200.100, and communication client 108d can be reached at the IP address 64.230.200.102, using a default port (in this case, port 5060), which may optionally be identified in a sub-address field 208 of the record 220* associated with customer 101A. Alternatively, the sub-address field 208 of the record 220* associated with customer 101A can be left blank.

As individual ones of communication clients 108A, 108B are activated, the residential/business gateway 102 can communicate their presence to the control entity 150, and the control entity 150 executes the previously described registration process in respect of the individual communication clients 108A, 108B. This results in two of three sub-address fields 208 of the record 220* associated with customer 101A being populated with the identity of ports 8080 and 8081. For its part, the third sub-address field 208 of the record 220* associated with customer 101A is populated with the identity of whatever port communication client 108d uses, as can be conveyed during the registration phase.

It should be understood that individual ones of communication clients 108A, 108B, 108d may be de-activated and/or re-activated at random times. This can correspondingly result in a fluctuation regarding how many sub-address fields 208 there will be for the record 220* associated with customer 101A, and what they will contain.

It should also be understood that an alias (or "nickname", or "extension") can be associated with communication client 108d, as was described earlier with respect to communication clients 108A and 108B. In the present non-limiting example, the alias associated with communication client 108d is "911".

The association between the alias "911" and communication client 108d is stored in the database 200*. Specifically, the record 220* associated with customer 101A comprises three alias fields 210, each of which maps a respective address/sub-address pair of the record 220* with the alias of the communication client reachable at that address/sub-address pair. Thus, address/sub-address 64.230.200.102 (which is used to reach communication client 108d) is associated with alias "911".

Still other embodiments are within the scope of the present invention. For example, it is contemplated that sub-addresses need not be utilized. In particular, consider the case where all communication clients have public IP addresses. Here, the address fields 204 of the various records in the corresponding database 200, 200* would store all the information needed to reach the various communication clients.

Figure 3:
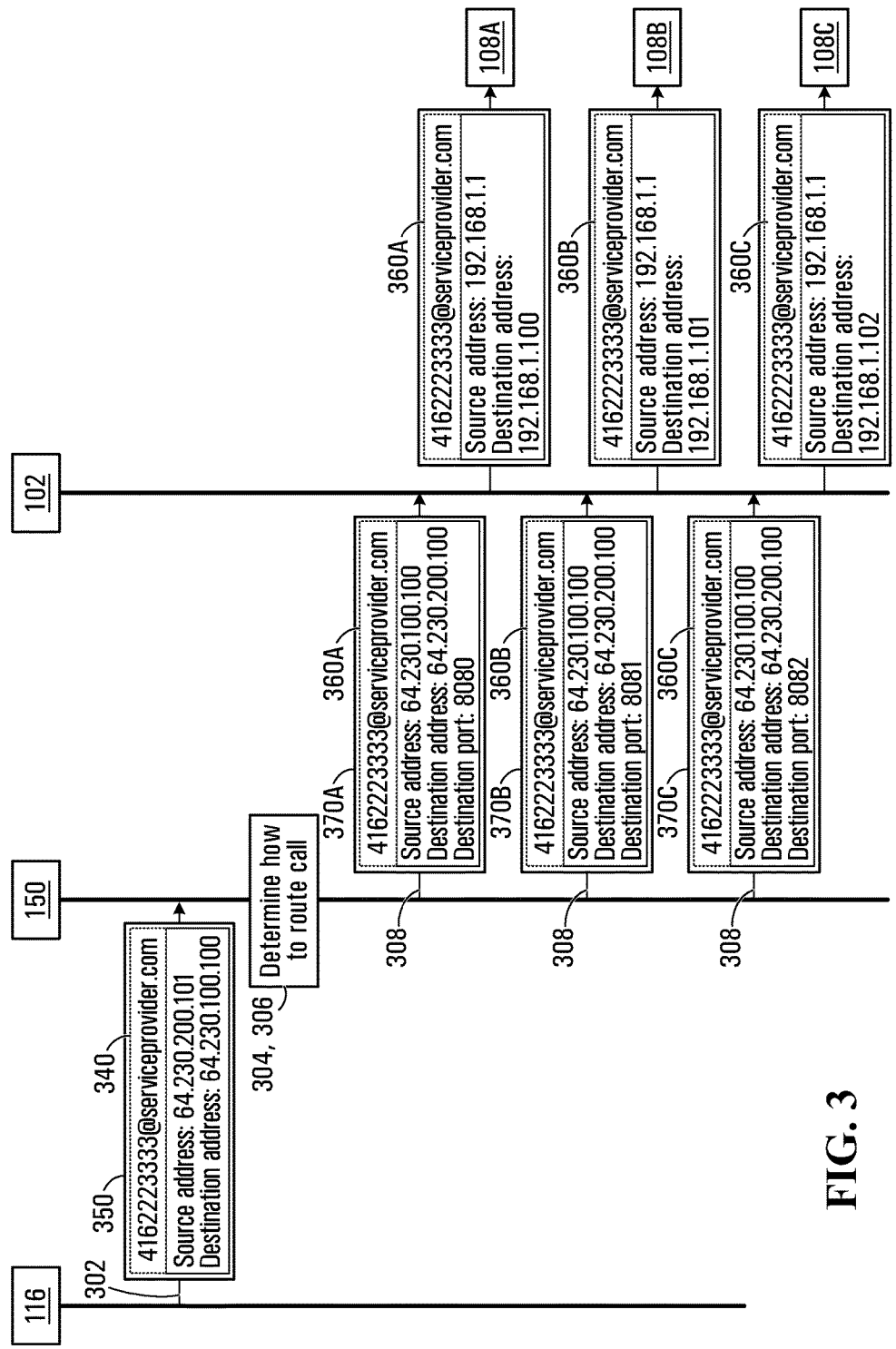
FIG. 3 is a call flow diagram illustrating an example call scenario where the call is an external inbound call.

In accordance with a specific non-limiting embodiment of the present invention, the VPBX service mentioned above can be provided by the control entity 150. In particular, the control entity 150 comprises suitable software, hardware, firmware and/or control logic for implementing a VPBX process in accordance with the following non-limiting examples of message flow, now described in context with reference to FIGS. 3, 4 and 5 in relation to various possible call scenarios.

More specifically, three example call scenarios are described. Firstly, with reference to FIG. 3, an external inbound call (from the perspective of customer 101A) is placed, namely customer 101B calls customer 101A without necessarily attempting to reach the user of any particular one of the communication devices 108A, 108B, 108C. Secondly, with reference to FIG. 4, an internal call (from the perspective of customer 101A) is placed, namely the user of one communication client (say, communication client 108A) calls the user of another communication client (say, communication client 108B). Finally, with reference to FIG. 5, an external outgoing call (from the perspective of customer 101A) is placed, namely the user of communication client 108A calls customer 101B.

External Inbound Call (FIG. 3)
Step 302
    Customer 101B places a call to customer 101A. In particular, communication client 116, which is being used by customer 101B, can generate a session request (e.g., a SIP INVITE message) 340 that contains an indication of the called party such as the complete customer identifier of customer 101A (namely, "4162223333@serviceprovider.com") or a portion thereof (such as "4162223333", for example). The session request 340 is placed into a call-related packet 350 having a source address that is the IP address of communication client 116 (namely, "64.230.200.101") and a destination address that is the IP address of the control entity 150 (namely, "64.230.100.100").

Step 304
    The control entity 150 gains knowledge of the call being placed by customer 101B. This can be obtained as a result of the call-related packet 350 arriving at the switching entity 152. The control entity 150 interprets the call-related packet 350 to obtain the session request 340 containing an indication of the called party and possibly other ancillary data relating to the call. The control entity 150 then consults the database 200 in an attempt to determine how to route the call.

More specifically, the control entity 150 seeks to determine a correspondence between the called party and either:

(i) the customer identifier field 202 of any record in the database, or (ii) any alias field 210 of a record having an address/sub-address pair that matches the source address and source port of the packet 350 containing the session request 340 and whose entry in the subscriber field 206 is a YES.

In this particular case, the called party corresponds to the customer identifier field 202 of the record 220 associated with customer 101A. Hence, part (i) of the above matching process is satisfied. The corresponding entry in the address field 204 of the record 220 is "64.230.200.100". Of note is the fact that there are three entries in the sub-address field 208 of the record 220 that share the same address (i.e., one for each of the communication clients 108A, 108B, 108C). Accordingly, the control entity 150 replicates the session request into three session requests (e.g., SIP INVITE messages) 360A, 360B, 360C. This is known as "call forking". The three session requests 360A, 360B, 360C are placed into respective call-related packets 370A, 370B, 370C each having a source address of 64.230.100.100 and a destination address of 64.230.200.100. In addition, call-related packet 370A will have a destination port of 8080, call-related packet 360B will have a destination port of 8081 and call-related packet 360C will have a destination port of 8082.

As an option, if neither step in the matching process is satisfied, error processing may be invoked.

Step 306

The control entity 150 sends the call-related packets 370A, 370B, 370C containing the session requests 360A, 360B, 360C towards the residential/business gateway 102 via the switching entity 152. This can be done contemporaneously or in sequence.

Step 308

At the residential/business gateway 102, the call-related packets 370A, 370B, 370C containing the session requests 360A, 360B, 360C are received. Based on the destination port of the call-related packets 370A, 370B, 370C, the residential/business gateway 102 replaces the destination address of each received call-related packet with the private IP address of the appropriate communication client (in this case, 192.168.1.100, 192.168.1.101 or 192.168.1.102). In addition, the residential/business gateway 102 may or may not need to change the destination port prior to sending the translated call-related packets onto the local network 110. In this way, each of the communication clients 108A, 108B, 108C individually receives the respective session request 360A, 360B, 360C, which can result in ringing of all three communication clients 108A, 108B, 108C, either contemporaneously or in sequence. In addition, in the illustrated embodiment, the residential/business gateway 102 replaces the source address of each received call-related packet with the private IP address of the residential/business gateway (in this case, 192.168.1.1), but it should be appreciated that this is not required, as the call-related packets 370A, 370B, 370C can retain their source address (i.e., 64.230.100.100, associated with the control entity 150) when they are forwarded to the communication clients 108A, 108B, 108C, respectively. The manner in which the control entity 150 manages the subsequent steps in a call that has plural possible respondents is known to persons skilled in the art and, as such, need not be described here.

Figure 4:
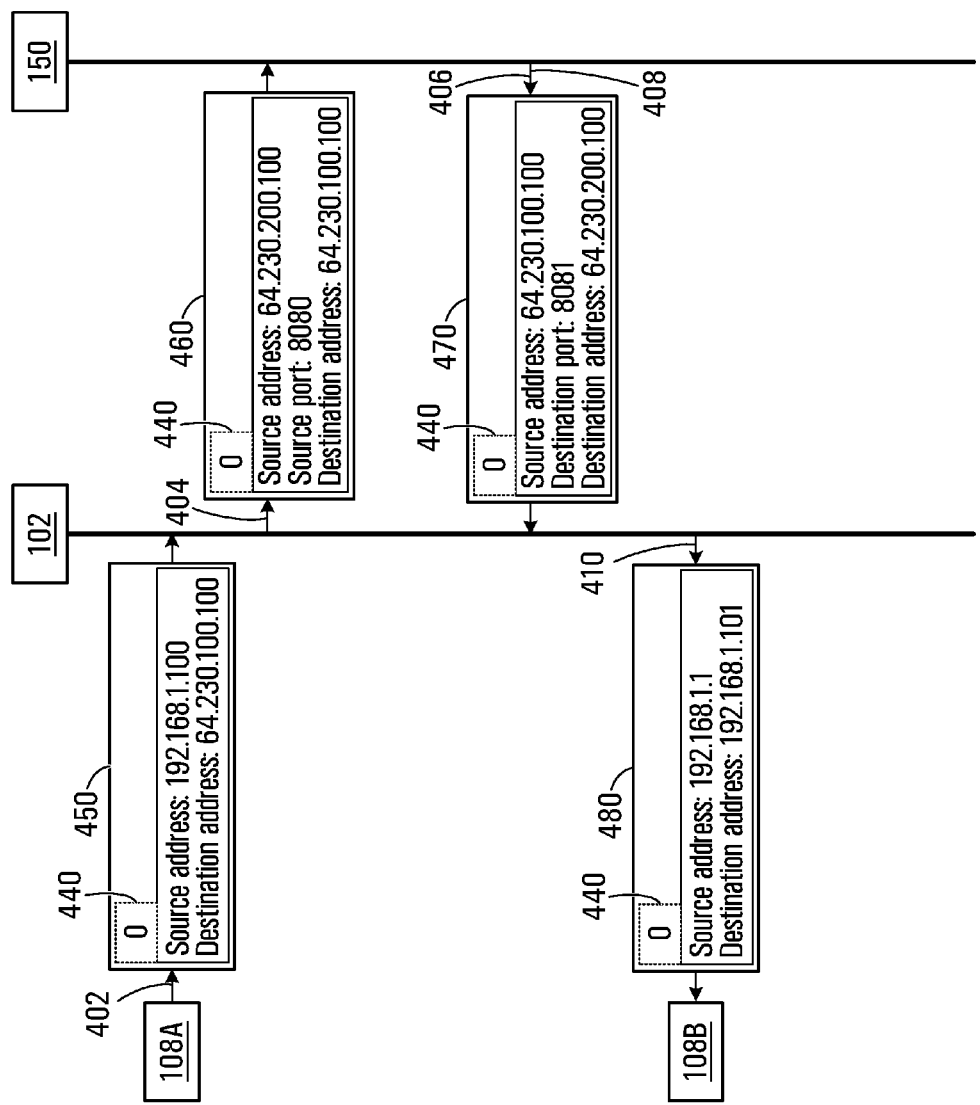
FIG. 4 is a call flow diagram illustrating an example call scenario where the call is an internal call.

Internal Call (FIG. 4)

Step 402

The user of communication client 108A places a call to the user of communication client 108B. In the present non-limiting embodiment, the alias associated with communication client 108B is "0", and therefore the call is placed by simply dialing "0" from communication client 108A. In particular, communication client 108A can generate a session request (e.g., a SIP INVITE message) 440 that contains an indication of the called party such as "0". In some embodiments, it is envisaged that this indication may be provided in a special field of the SIP invite message that is dedicated to identifying a potential alias for the session request. The session request 440 is placed into a call-related packet 450 having a source address that is the (private) IP address of communication client 108A (namely, "192.168.1.100") and a destination address that is the IP address of the control entity 150 (namely, "64.230.100.100").

Optionally, ancillary information (such as an initial or trailing "*" or "#" or other code) may be provided by the user of communication client 108A to indicate that the call is to be placed for another communication client that shares the same customer identifier.

Step 404

The residential/business gateway 102 receives the call-related packet 450 (containing the session request 440) from within the local network 110 and, specifically, determines based on the source address and the source port of the call-related packet 450 that it has been received from a device having the (private) IP address 192.168.1.100. Accordingly, the residential/business gateway 102 sends the received (outward bound) packet onto the data network 104, but replaces the source address of the packet with the public IP address of the residential/business gateway 102. Such address translation is effected using the aforementioned internal mapping maintained by the residential/business gateway 102. In addition, the residential/business gateway 102 sets the source port, which may or may not correspond to the source port of the call-related packet 450. Thus, in the present non-limiting example, the residential/business gateway 102 places the session request 440 into a translated call-related packet 460 having a source address of 64.230.200.100 (which is the (public) IP address of the residential/business gateway 102), a source port of 8080 and a destination address of 64.230.100.100. Meanwhile, the session request 440 contained in the translated call-related packet 460 continues to identify the called party as "0". The translated call-related packet 460 is forwarded over the data network 104 and arrives at the network element 112.

Step 406

The control entity 150 gains knowledge of the call and, specifically, gains knowledge that the call has been placed by communication client 108A. This knowledge can be obtained from the translated call-related packet 460 arriving at the switching entity 152. The control entity 150 interprets the translated call-related packet 460 to obtain the session request 440 containing an indication of the called party and possibly other ancillary data relating to the call. The control entity 150 then consults the database 200 in an attempt to determine how to route the call.

More specifically, the control entity 150 seeks to determine a correspondence between the called party and either:
(i) the customer identifier field 202 of any record in the database; or
(ii) any alias field 210 of a record having an address/sub-address pair that matches the source address and source port of the packet 460 containing the session request 440 and whose entry in the subscriber field 206 is a YES.

In this particular case, firstly, it is determined that there is indeed a record having an address/sub-address pair that matches the source address (namely 64.230.200.100) and source port (namely 8080) of the translated call-related packet 460 containing the session request 440. Specifically, this is record 220, which is associated with customer 101A who is a subscriber to the VPBX service. Secondly, it is noted that record 220 does indeed have an alias field 210 that matches the indication of the called party (i.e., "0"). Hence, part (ii) of the above matching process is satisfied. The control entity 150 then proceeds to determine the address/sub-address pair that corresponds to the alias field 210 that was found to be matching. In the present example, the corresponding address/sub-address pair is 64.230.200.100 and 8081.

Accordingly, the control entity 150 forwards the session request 440 but places it into a call-related packet 480 having a source address of 64.230.100.100, a destination port of 8081 and a destination address of 64.230.200.100.

It should be noted that if ancillary information accompanies the alias, the control entity 150 can determine from the presence of the ancillary information that the call is an internal call, and therefore can proceed directly to attempt part (ii) of the matching process mentioned above, thereby saving computational expense. As an option, if neither step in the matching process is satisfied, error processing may be invoked.

Step 408
The control entity 150 sends the call-related packet 480 containing the session request 440 towards the residential/business gateway 102 via the switching entity 152.

Step 410
At the residential/business gateway 102, the call-related packet 480 containing the session request 440 is received. Based on the destination port of the call-related packet 480, the residential/business gateway 102 replaces the destination address of the received call-related packet 480 with the private IP address of the appropriate communication client (in this case, 192.168.1.101). In addition, the residential/business gateway 102 may or may not need to change the destination port prior to sending the received call-related packet 480 onto the local network 110. In addition, in the illustrated embodiment, the residential/business gateway 102 replaces the source address of the received call-related packet 480 with the private IP address of the residential/business gateway (in this case, 192.168.1.1), but it should be appreciated that this is not required, as the call-related packet 480 can retain its source address (i.e., 64.230.100.100, associated with the control entity 150) when it is forwarded to communication client 108B. Ultimately, communication client 108B receives the session request 440 that allows it to answer the call placed by the user of communication client 108A.

Figure 5:
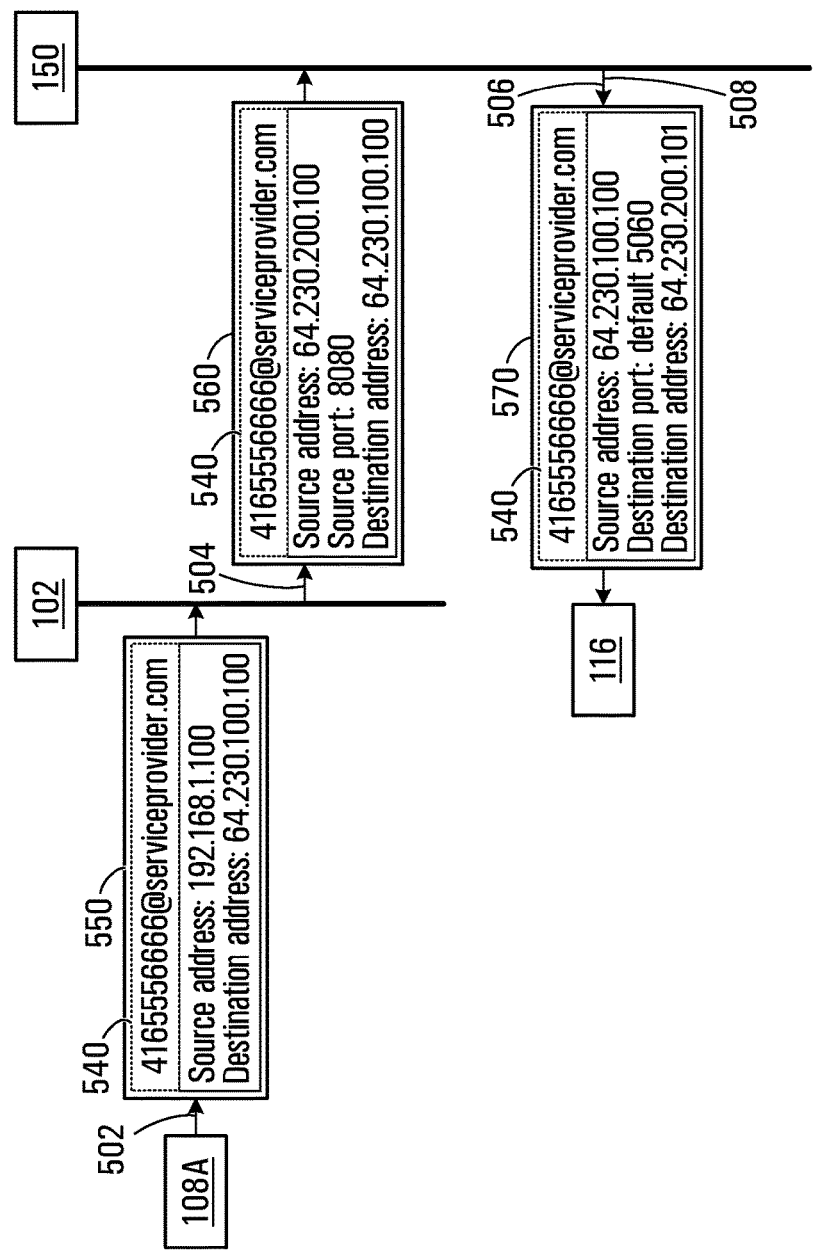
FIG. 5 is a call flow diagram illustrating an example call scenario where the call is an external outgoing call.

External Outgoing Call (FIG. 5)

Step 502
The user of communication client 108A places a call to customer 101B. In particular, communication client 108A can generate a session request (e.g., a SIP INVITE message) 540 that contains an indication of the called party such as the complete customer identifier of customer 101B (namely, "4165556666@serviceprovider.com") or a portion thereof (such as "4165556666", for example). The session request 540 is placed into a call-related packet 550 having a source address that is the private IP address of communication client 108A (namely, "192.168.1.100") and a destination address that is the IP address of the control entity 150 (namely, "64.230.100.100").

Step 504
The residential/business gateway 102 receives the call-related packet 550 (containing the session request 540) from within the local network 110 and, specifically, determines based on the source address and the source port of the call-related packet 550 that it has been received from a device having the (private) IP address 192.168.1.100. Accordingly, the residential/business gateway 102 sends the received (outward bound) packet onto the data network 104, but replaces the source address of the packet with the public IP address of the residential/business gateway 102. In addition, the residential/business gateway 102 sets the source port, which may or may not correspond to the source port of the call-related packet 550. Thus, in the present non-limiting example, the residential/business gateway 102 places the session request 540 into a translated call-related packet 560 having a source address of 64.230.200.100 (which is the (public) IP address of the residential/business gateway 102), a source port of 8080 and a destination address of 64.230.100.100. Meanwhile, the session request 540 contained in the translated call-related packet 560 continues to identify the called party as "4165556666@ serviceprovider.com" or "4165556666". The translated call-related packet 560 is forwarded over the data network 104 and arrives at the network element 112.

Step 506
The control entity 150 gains knowledge of the call being placed by customer 101A. This can be obtained as a result of the translated call-related packet 560 arriving at the switching entity 152. The control entity 150 interprets the translated call-related packet 560 to obtain the session request 540 containing an indication of the called party and possibly other ancillary data relating to the call. The control entity 150 then consults the database 200 in an attempt to determine how to route the call.

More specifically, the control entity 150 seeks to determine a correspondence between the called party and either:
(i) the customer identifier field 202 of any record in the database; or
(ii) any alias field 210 of a record having an address/sub-address pair that matches the source address and source port of the packet 560 containing the session request 540 and whose entry in the subscriber field 206 is a YES.

In this particular case, the called party corresponds to the customer identifier field 202 of the record 230 associated with customer 101B. Hence, part (i) of the above matching process is satisfied. The corresponding entry in the address field 204 of the record 230 is "64.230.200.101". Of note is the fact that there is only one entry in the sub-address field 208 of the record 230 for the address 64.230.200.101. Accordingly, the control entity 150 forwards the session request 540 but places it into a call-related packet 580 having a source address of 64.230.100.100, a destination address of 64.230.200.101, and a default destination port (corresponding to the default entry 5060 in the sub-address field 208 of the record 230 associated with customer 101B).

In the case where the destination of the call cannot be resolved, error processing may be invoked.

Step 508

The control entity 150 sends the call-related packet 580 containing the session request 540 towards communication client 116 via the switching entity 152. Ultimately, communication client 116 receives the session request 540 that allows it to answer the call placed by the user of communication client 108A.

It will therefore be appreciated that by virtue of the VPBX process executed in the control entity 150, customer 101B can reach customer 101A by using the customer identifier of customer 101A, and that this will allow the call to be answered by any of the communication clients 108A, 108B, 108C that share the same customer identifier. This makes customer 101A appear as a single line to customer 101B. Meanwhile, the VPBX process executed in the control entity 150 allows users of individual ones of the communication clients 108A, 108B, 108C to reach one another by simply dialing the associated extension. In addition, it is noted that customer 101A does not need to purchase or lease any PBX or key system hardware in order to benefit from the present solution.

It should also be mentioned that by virtue of the non-limiting embodiments disclosed above, the network element 112 can implement a virtual PBX feature for a plurality of customers. Let this plurality of customers include a first customer associated with a plurality of first endpoints and a second customer associated with a plurality of second endpoints. Thus, by virtue of the VPBX process executed in the control entity 150, the first customer can be reached by using the customer identifier of the first customer, and that this will allow the call to be answered by any of the plurality of first endpoints that share the customer identifier of the first customer; this makes the first customer appear as a single line to the outside caller. Similarly, the second customer can be reached by using the customer identifier of the second customer, and that this will allow the call to be answered by any of the plurality of second endpoints that share the customer identifier of the second customer; this makes the second customer appear as a single line to the outside caller. Meanwhile, the VPBX process executed in the control entity 150 allows users of individual ones of the first endpoints to reach one another by simply dialing the associated extension, and it also allows users of individual ones of the second endpoints to reach one another by simply dialing the associated extension. Thus, two customers who may be remote from, and independent of, one another can nevertheless be serviced by the same network entity 112, and neither the first customer nor the second customer needs to purchase or lease any PBX or key system hardware in order to benefit from the present solution.

Persons skilled in the art will also appreciate that among the numerous variations and modifications that are within the scope of the present invention, one possibility is to relegate some of the functionality of the control entity 150 to the residential/business gateway 102. Specifically, it is envisaged that a SIP-aware gateway that is capable of sending, receiving and/or processing SIP INVITE messages, and which is equipped with the appropriate database (e.g., 200, 200*), may be able to implement some of the features of the control entity 150. Examples of features that may the be relegated to a SIP-aware gateway include (i) the aforementioned call forking performed upon receipt of an external call and/or (ii) the routing of an internal call from one of the communication clients 108A, 108B, 108C to another without involving the control entity 150, to name a few.

While specific embodiments of the present invention have been described and illustrated, it will be apparent to those skilled in the art that further modifications and variations can be made without departing from the scope of the invention as defined in the appended claims.

The invention claimed is:

1. A method of implementing a virtual private branch exchange (PBX) feature for a customer associated with a plurality of VoIP communication clients each capable of placing and receiving VoIP telephone calls, comprising:
receiving at a control entity providing the virtual PBX feature information regarding a call comprising a source address/sub-address pair and a destination identifier;
at the control entity, consulting a database to determine using the information regarding the call if the call is an external inbound call directed to the customer or an internal call from one of the VoIP communication clients associated with the customer that identifies a different particular one of the VoIP communication clients, the database comprising a plurality of records each record storing a customer identifier and at least one address/sub-address pairs of at least one communication client of the associated customer, at least one of the stored records further storing a plurality of sub-address each associated with a respective alias of a communication device;
responsive to determining that the call is an external inbound call directed to the customer, causing the call to be routed to each of the plurality of VoIP communication clients associated with the customer without being passed through a PBX or key system;
responsive to determining that the call is an internal call by matching the source address/sub-address pair of the received call information to a stored record in the database and an alias in the received call information to an alias in the record, causing the call to be routed to the particular one of the VoIP communication clients associated with the alias without being passed through a PBX or key system.

2. The method defined in claim 1, wherein causing the call to be routed to the plurality of VoIP communication clients associated with the customer comprises causing the call to be routed to each of the plurality of VoIP communication clients associated with the customer.

3. The method defined in claim 2, wherein causing the call to be routed to the plurality of VoIP communication clients associated with the customer comprises causing the call to be routed to each of the plurality of VoIP communication clients associated with the customer contemporaneously.

4. The method defined in claim 2, wherein causing the call to be routed to the plurality of VoIP communication clients associated with the customer comprises causing the call to be routed to each of the plurality of VoIP communication clients associated with the customer in sequence.

5. The method defined in claim 1, wherein the information regarding the call comprises a session request.

6. The method defined in claim 5, wherein causing the call to be routed to the different particular one of the VoIP communication clients comprises sending the session request to the particular one of the VoIP communication clients.

7. The method defined in claim 6, wherein the session request is a session initiation protocol (SIP) INVITE message.

8. The method defined in claim 6, wherein sending the session request to the different particular one of the VoIP communication clients comprises formulating a packet to convey said session request to a gateway, said packet being given a destination that is an address associated with the gateway.

9. The method defined in claim 8, the information regarding the call comprising a source address and an indication of a called party, wherein sending the session request to the different particular one of the VoIP communication clients further comprises consulting a database on a basis of the source address and the indication of the called party to obtain the address associated with the gateway.

10. The method defined in claim 6, wherein sending the session request to the different particular one of the VoIP communication clients comprises formulating a packet to convey said session request to a gateway, said packet being given a destination that is indicative of an address associated with the gateway and is indicative of a sub-address associated with the different particular one of the VoIP communication clients.

11. The method defined in claim 10, the information regarding the call comprising a source address/sub-address pair and an indication of a called party, wherein sending the session request to the different particular one of the VoIP communication clients further comprises consulting a database on a basis of the source address/sub-address pair and the indication of the called party to obtain the address associated with the gateway and the sub-address associated with the particular one of the VoIP communication clients.

12. The method defined in claim 6, wherein sending the session request to the different particular one of the VoIP communication clients comprises formulating a packet, the packet being given a respective destination that is an address associated with the different particular one of the VoIP communication clients.

13. The method defined in claim 12, the information regarding the call comprising an indication of a called party, wherein sending the session request to the different particular one of the VoIP communication clients further comprises consulting a database on a basis of the indication of the called party to obtain the address associated with the different particular one of the VoIP communication clients.

14. The method defined in claim 6, wherein sending the session request to the different particular one of VoIP communication clients comprises formulating a packet, the packet being given a respective destination that is an address/sub-address pair associated with the different particular one of the VoIP communication clients.

15. The method defined in claim 14, the information regarding the call comprising an indication of a called party, wherein sending the session request to the different particular one of the VoIP communication clients further comprises consulting a database on a basis of the indication of the called party to obtain the address/sub-address pair associated with the different particular one of the VoIP communication clients.

16. The method defined in claim 5, wherein causing the call to be routed to the plurality of VoIP communication clients comprises sending the session request to each of said VoIP communication clients.

17. The method defined in claim 16, further comprising effecting a call forking operation to replicate the session request for each of said VoIP communication clients.

18. The method defined in claim 17, wherein the session request is a session initiation protocol (SIP) INVITE message.

19. The method defined in claim 17, wherein sending the session request to each of said VoIP communication clients comprises formulating a respective packet to convey said session request to a gateway, said respective packet being given a destination that is an address associated with the gateway.

20. The method defined in claim 19, the information regarding the call comprising a source address and an indication of a called party, wherein sending the session request to each of said VoIP communication clients further comprises consulting a database on a basis of the source address and the indication of the called party to obtain the address associated with the gateway.

21. The method defined in claim 17, wherein sending the session request to each of said VoIP communication clients comprises formulating a respective packet to convey said session request to a gateway, said respective packet being given a destination that is indicative of an address associated with the gateway and is indicative of a sub-address associated with the respective one of said VoIP communication clients.

22. The method defined in claim 21, the information regarding the call comprising a source address/sub-address pair and an indication of a called party, wherein sending the session request to each of said VoIP communication clients further comprises consulting a database on a basis of the source address/sub-address pair and the indication of the called party to obtain, for each said respective packet, the address associated with the gateway and the sub-address associated with the respective one of said VoIP communication clients.

23. The method defined in claim 17, wherein sending the session request to each of said VoIP communication clients comprises formulating a packet for each of said VoIP communication clients, the packet for a given one of said VoIP communication clients being given a respective destination that is an address associated with the given one of said VoIP communication clients.

24. The method defined in claim 23, the information regarding the call comprising an indication of a called party, wherein sending the session request to a given one of said VoIP communication clients further comprises consulting a database on a basis of the indication of the called party to obtain the address associated with the given one of said VoIP communication clients.

25. The method defined in claim 17, wherein sending the session request to each of said VoIP communication clients comprises formulating a packet for each of said VoIP communication clients, the packet for a given one of said VoIP communication clients being given a respective destination that is an address/sub-address pair associated with the given one of said VoIP communication clients.

26. The method defined in claim 25, the information regarding the call comprising an indication of a called party, wherein sending the session request to a given one of said VoIP communication clients further comprises consulting a database on a basis of the indication of the called party to obtain the address/sub-address pair associated with the given one of said VoIP communication clients.

27. The method defined in claim 1, wherein the determining and causing steps are executed only if the customer subscribes to the virtual PBX feature.

28. The method defined in claim 27, further comprising:
determining whether the customer subscribes to the virtual PBX feature.

29. The method defined in claim 28, wherein said determining whether the customer subscribes to the virtual PBX feature is executed after said receiving.

30. The method defined in claim 1, wherein the information regarding the call comprises an indication of a called party.

31. The method defined in claim 30, further comprising processing the indication of the called party to determine if the call is an external inbound call or an internal call from one of the Vol P communication clients that identifies a different particular one of the VoIP communication clients.

32. The method defined in claim 31, wherein if the indication of the called party comprises an identifier associated with the customer, then the call is determined to be an external inbound call.

33. The method defined in claim 32, wherein if the indication of the called party comprises an identifier of a particular one of the VoIP communication clients, then the call is determined to be an internal call from a different one of the VoIP communication clients that identifies the particular one of the VoIP communication clients.

34. The method defined in claim 33, wherein the identifier of the particular one of the VoIP communication clients is an alias registered in association with the particular one of the VoIP communication clients.

35. The method defined in claim 34, wherein the alias registered in association with the particular one of the VoIP communication clients comprises a code that is different from an IP address associated with the particular one of the VoIP communication clients.

36. The method defined in claim 31, wherein if the indication of the called party comprises an identifier of a particular one of the VoIP communication clients, then the call is determined to be an internal call from a different one of the VoIP communication clients that identifies the particular one of the VoIP communication clients.

37. The method defined in claim 1, the customer being a first customer, the information regarding the call comprising an identifier associated with a given customer, the method further comprising:
consulting a database of records associated with respective customers and further associated with respective customer identifiers in an attempt to identify a particular one of the records for which the associated customer identifier matches the identifier associated with the given customer, wherein, if said attempt is successful and the particular one of the records is associated with the first customer, it is determined that the call is an external inbound call destined for the first customer.

38. The method defined in claim 1, further comprising:
determining from the information regarding the call if the call is an external outbound call that identifies a particular external destination;
causing the call to be routed towards the external destination.

39. The method defined in claim 38, the customer being a first customer, the information regarding the call comprising an identifier associated with a given customer, the method further comprising:
consulting a database of records associated with respective customers and further associated with respective customer identifiers in an attempt to identify a particular one of the records for which the associated customer identifier matches the identifier associated with the given customer, wherein, if said attempt is successful and the particular one of the records is associated with a second customer other than the first customer, it is determined that the call is an external outbound call destined for the second customer.

40. The method defined in claim 1, the information regarding the call comprising a source address/sub-address pair and an indication of a called party, the method further comprising:
consulting a record for the customer, said record associated with a plurality of address/sub-address pairs and a plurality of aliases respectively associated with the plurality of VoIP communication clients and the plurality of address/sub-address pairs, in an attempt to determine (I) whether any of the plurality of address/sub-address pairs matches the source address/sub-address pair and (II) whether any of said plurality of aliases matches the indication of the called party, wherein, if said attempt is successful, it is determined that the call is an internal call from one of the VoIP communication clients.

41. The method defined in claim 40, wherein the particular one of the VoIP communication clients identified by the internal call is the one of said VoIP communication clients for which the respective alias was found to match the called party.

42. The method defined in claim 41, wherein each of the address/sub-address pairs comprises an IP address and a port.

43. The method defined in claim 1, the information regarding the call comprising a source address and an indication of a called party, the method further comprising:
consulting a record for the customer, said record associated with a plurality of addresses and a plurality of aliases respectively associated with the plurality of VoIP communication clients and the plurality of addresses, in an attempt to determine (I) whether any of the plurality of addresses matches the source address and (II) whether any of said plurality of aliases matches the indication of the called party, wherein, if said attempt is successful, it is determined that the call is an internal call from one of the VoIP communication clients.

44. The method defined in claim 43, wherein the particular one of the VoIP communication clients identified by the internal call is the one of said VoIP communication clients for which the respective alias was found to match the called party.

45. The method defined in claim 44, wherein each of the addresses comprises an IP address.

46. The method defined in claim 1, wherein the information regarding the call comprises ancillary information indicative of the call being an internal call.

47. A softswitch configured to implement the method defined in claim 1.

48. The method defined in claim 1, wherein the call is routed to the plurality of VoIP communication clients associated with the customer or to the particular one of the VoIP communication clients over an IP network.

49. A network element for implementing a virtual private branch exchange (PBX) feature for a customer associated with a plurality of VoIP communication clients each capable of placing and receiving VoIP telephone calls, comprising:
  means for receiving information regarding a call comprising a source address/sub-address pair and a destination identifier;
  means for consulting a database to determine using the information regarding the call if the call is an external inbound call directed to the customer or an internal call from one of the VoIP communication clients associated with the customer that identifies a different particular one of the VoIP communication clients, the database comprising a plurality of records each record storing a customer identifier and at least one address/sub-address pairs of at least one communication client of the associated customer, at least one of the stored records further storing a plurality of sub-address each associated with a respective alias of a communication device;
  means for causing the call to be routed to each of the plurality of VoIP communication clients associated with the customer, without being passed through a PBX or key system, if the call is determined to be an external inbound call directed to the customer;
  means for causing the call to be routed to a different particular one of the VoIP communication clients associated with an alias, without being passed through a PBX or key system, if the call is determined to be an internal call by matching the source address/sub-address pair of the received call information to a stored record in the database and an alias in the received call information to the alias in the record.

50. Non-transitory computer-readable media comprising computer-readable program code which, when executed by a network element, causes the network element to implement a virtual private branch exchange (PBX) feature for a customer associated with a plurality of VoIP communication clients each capable of placing and receiving VoIP telephone calls, the computer-readable program code comprising:
  first computer-readable program code for causing the network element to be attentive to receipt of information regarding a call comprising a source address/sub-address pair and a destination identifier;
  second computer-readable program code for causing the network element to consult a database to determine using the information regarding the call if the call is an external inbound call directed to the customer or an internal call from one of the VoIP communication clients associated with the customer that identifies a different particular one of the VoIP communication clients, the database comprising a plurality of records each record storing a customer identifier and at least one address/sub-address pairs of at least one communication client of the associated customer, at least one of the stored records further storing a plurality of sub-address each associated with a respective alias of a communication device;
  third computer-readable program code for causing the network element to cause the call to be routed to each of the plurality of VoIP communication clients associated with the customer, without being passed through a PBX or key system, if the call is determined to be an external inbound call directed to the customer;
  fourth computer-readable program code for causing the network element to cause the call to be routed to a different particular one of the VoIP communication clients associated with an alias, without being passed through a PBX or key system, if the call is determined to be an internal call by matching the source address/sub-address pair of the received call information to a stored record in the database and the alias in the received call information to an alias in the record.

51. A system, comprising
  a plurality of VoIP communication clients for communication over a network, the plurality of VoIP communication clients being associated with a customer and a respective alias, and each capable of placing and receiving VoIP telephone calls;
  a database comprising a plurality of records each record storing a customer identifier and at least one address/sub-address pairs of at least one communication client of the associated customer, at least one of the stored records further storing a plurality of sub-address each associated with a respective alias of a communication device
  a network element in the network, said network element implementing a virtual private branch exchange (PBX) feature for said customer, said network element comprising:
    a switching entity with hardware configured to route calls from a respective calling party to a respective called party on a basis of control instructions;
    a control entity configured to generate said control instructions, said control instructions for causing the switching entity to route a given call, without passing the call through a PBX or key system, either to the plurality of VoIP communication clients or to a particular one of the VoIP communication clients, depending on whether the call is determined to be an external inbound call for the customer or an internal call by matching a source address/sub-address pair of received call information to a stored record in the database and an alias in the received call information to an alias in the record from a different one of the VoIP communication clients that identifies the particular one of the VoIP communication clients, respectively.

52. The system defined in claim 51, wherein the network is an IP network.

* * * * *